Jan. 16, 1973  H. W. ZUKERMAN  3,711,295
SHAPED RICE PRODUCT AND METHOD FOR
PRODUCING SAME
Filed Aug. 18, 1969

Inventor
HAROLD W. ZUKERMAN
BY  *Irving Faber*
ATTY.

United States Patent Office 3,711,295
Patented Jan. 16, 1973

3,711,295
SHAPED RICE PRODUCT AND METHOD FOR PRODUCING SAME
Harold W. Zukerman, 6035 N. Damen Ave., Chicago, Ill.
Filed Aug. 18, 1969, Ser. No. 850,864
Int. Cl. A23l 1/10
U.S. Cl. 99—80 R          10 Claims

ABSTRACT OF THE DISCLOSURE

A rice food product having a formed shape and preferably composed at least in part of individual rice grains or rice particles that are joined together, and further having a relatively crisp or hard outer surface as compared to its interior. The product has a new and distinctive mouthfeel and taste.

---

The present invention relates to a new food product and to a process for producing said product. More particularly, the invention is directed to a shaped rice product having an interior portion of joined rice grains or rice particles and a relatively crisp or hard exterior portion as compared to its interior.

Rice has long been one of the chief foods in man's diet throughout the world. Rice is usually steamed and served as separate and softened rice grains. Cooked rice of this sort has also been used in preparing puddings and casseroles. Rice can also be fried in hot oil. Once again, it is served as separate rice grains. In recent years dehydrated rice products in the form of puffed whole grains have appeared on the market. So-called dry rice noodles have also been prepared.

Although the food industry is acquainted with numerous methods of cooking and serving rice, to my knowledge no one has prepared a shaped product from rice containing an interior of rice grains or rice particles that are joined together and a relatively hard or crisp exterior as compared with said interior. It was a principal object of the present invention to provide such a product.

Another object of the invention is to provide a shaped and cooked rice food item which, when heated before consumption, produces a product having a relatively hard or crisp exterior as compared with its interior.

A still further object of the invention is to provide a shaped and cooked rice food item which, when heated before consumption, produces a product having a relatively crisp exterior and an interior having distinguishable rice grains or rice particles that are joined together.

Another object of the invention is to provide an efficient and advantageous process for producing a rice food item which, when heated by an ultimate consumer, produces a product having a crisp exterior and a soft interior.

Another object of the invention is to provide an efficient and advantageous process for producing a food item which, when heated by a ultimate consumer, produces a product having a crisp exterior and an interior having distinguishable rice grains or rice particles that are joined together.

In general, the present invention comprises the discovery of a novel food product prepared from rice and to a process for producing such a product.

The invention can best be understood by referring to the accompanying drawing in which.

Figure 1:
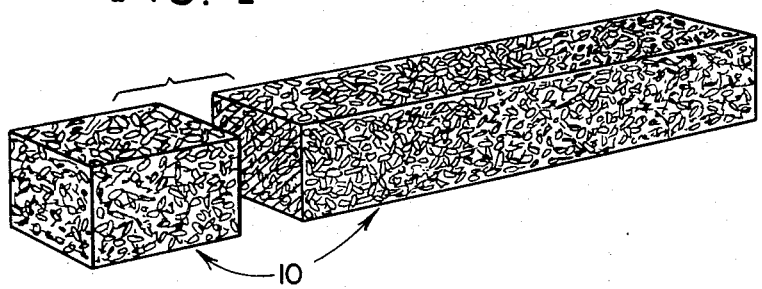
FIG. 1 is a perspective view of the product of the subject invention before such product is treated to produce a crust.

In FIG. 1, the shaped rice product is indicated generally by reference character 10. Although the product is shown as having a rectangular shape, it should be understood that other shapes may be adopted, such as curl, ball, donut, hexagonal, triangular, octagonal, animal, etc. Interior 12 is composed of cooked and broken or unbroken rice grains which are joined together. Ordinarily, interior 12 appears to have a homogeneous consistency. When examined under a microscope, however, the interior usually is found to contain not only a starchlike substance but also individual rice cells, and preferably, distinguishable rice particles or grains. On occasion, interior 12 will appear as cooked rice grains or rice particles cohering together as illustrated in FIG. 1. This is usually true when the rice is cooked without breaking the grains and the product is shaped without excessive compression. As will be pointed out more fully below, the interior may contain various edible oils, artificial color, and flavors such as spices, herbs, cheese, pizza, onion, butter, and so forth.

Figure 2:
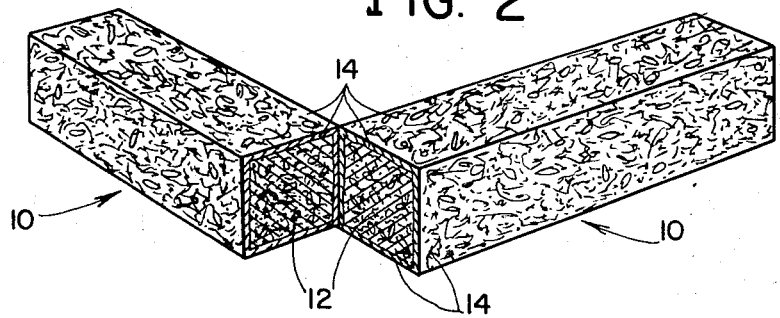
FIG. 2 is a perspective view of such product after the relatively crisp surface has been formed on said product.
Figure 2:
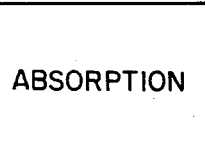
Figure 2:
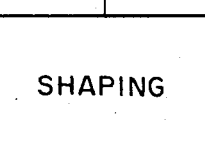

The crust 14 of the shaped rice product shown in FIG. 2 can be formed through the use of a variety of heating means such as hot air, hot oil, hot air blown salt, infrared heat, etc. The crust 14 completely encloses interior 12 and allows the individual product units 10 to keep their predetermined shape while maintaining a high level of structural stability.

The color of the crust is a result of a controlled selection of the following conditions: (1) the type of heating process selected, (2) the temperature and the duration of the heating step, and (3) the addition of reducing sugars and/or artificial color to the product.

Figure 3:
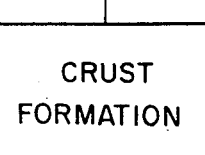
FIG. 3 is a diagrammatical representation of the steps of the process used to produce a shaped and cooked rice product.
Figure 3:
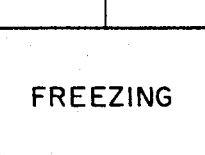

FIG. 3 shows the steps of a process for preparing the shaped rice product of FIGS. 1 and 2.

It is necessary that the product have the proper viscosity or consistency for shaping. When rice absorbs an excessive amount of water it becomes so fluid that it cannot be molded into a given shape. On the other hand, when an insufficient amount of water is absorbed interior 12 does not soften as desired but remains hard in texture and unacceptable in taste.

My experiments indicated that a workable percentage of water to rice is about 1.0 to 3.5 lbs. of water for each 1.0 lb. of rice, preferably from 2 to 3 lbs, of water per pound of rice, and most preferably about 2.5 lbs. of water per pound of rice. In addition to the amount of water added, one can also vary the nature of the interior by controlling the rate at which water is absorbed by the rice grains. If the rice absorbs water too rapidly, some of its cells swell excessively and burst releasing free starch. In contrast, a high degree of unbroken rice cells results when water is added slowly to rice over a 45 minute period, rather than all at one time.

If it is necessary to add all the water at one time, it is preferred to precoat the rice with a vegetable oil which serves to control the water absorption rate. I have found that by coating 100 lbs. of broken or whole grain rice with about 1 to 8 lbs. of an edible oil and adding the precoated rice to boiling water (preferably 200–300 lbs.) and simmering for about 20 to 40 minutes (most often 25–35) I obtained a cooked rice with a high percentage of unbroken rice cells. While it is being cooked the mixture should be stirred. The cooking can take place at atmospheric pressure in an open kettle. If it is desired, of course, a pressurized cooker can be employed.

I have found that water binders may be blended with the water-rice mixture prior to cooking, although they are not necessarily required. The binders that can be used include: farinaceous powders, methylcellulose gums, gelatins, carrageen, natural gums, potato starch, etc. Spices and flavors such as cheese, pizza, onion, butter, etc., most often are blended with the rice prior to cooking.

After the mixture of rice water and flavoring have been cooked for a sufficient time to obtain the desired product consistency, the product is passed from the water absorption apparatus to a forming device. A suitable forming device is an extrusion apparatus which is comprised of a pumping means and a die head. The extruder die is designed so that it forms the desired shape when the product is forced through it by the pumping means.

Extrusion is only one of several ways to form or shape the cooked rice mixture. Molds can also be used for this purpose. The cooked rice mixture can also be passed through a cutting device which cuts the cooked rice mixture into predetermined shapes.

When the extrusion method is used the cooked rice mixture leaves the extruder die as shaped ribbons which are cut with a cutting apparatus into predetermined lengths. I have found that a rotary cutter is suitable for this purpose, although other cutters such as guillotines and cam-activated knives are also suitable.

After the product has been shaped and cut it is conveyed to a crust formation device. A suitable device for developing a crust on the surface of the formed rice product shape is a deep fat fryer. The temperature of the oil within the fryer is usually maintained at about 340° F. to about 410° F. and the shaped rice product ordinarily remains submerged for about 45 seconds to about 4 minutes. The submersion time and the oil temperature can be varied in accordance with the desired crust thickness and texture.

Deep fat frying is only one of several ways to develop a crust on the surface of the formed rice product shape. An infra-red heat source can also be used for this purpose. The distance between the infra-red heat source and the shaped rice product and the exposure time of the product to the rays are adjusted so that the proper texture and crust thickness are obtained.

Another way to develop a crust is with blown hot air. This technique requires that the formed rice shapes be exposed to an air temperature of about 500° F. to about 600° F. for about 3-5 minutes or until the proper crust texture and thickness develop.

When the crust is properly developed, the shaped rice product can be immediately eaten. Alternatively, the product can be preserved for consumption at a later date.

There are several methods for preserving the shaped rice product. One way is through the use of chemical preservatives such as sodium benzoate or the like. Another is to store the product under refrigeration. Still another method involves freezing the shaped rice product.

If the product is frozen, the temperature should be reduced as rapidly as possible. In this way cellular breakage is avoided which can occur when large water crystals are formed within the cells when the product is frozen over a long period of time.

Ordinarily, the product is weighed and packaged after it is frozen. It is contemplated, of course, that this freezing step can occur subsequent to the packaging step.

When the product is heated prior to being served, it again acquires a relatively hard or crisp outer surface and a soft interior. The precise taste of the product depends on the type of flavoring ingredient that is added to the original mix. Even without additional flavoring, however, the product has an advantageous and distinctive taste and mouth-feel.

The following example illustrates the formula for producing an onion flavored product of the subject invention.

EXAMPLE

One hundred (100) lbs. of broken rice grains were coated with three (3) lbs. of an edible vegetable oil. Two hundred and thirty (230) lbs. of water plus an onion flavor mix were added to the oil coated rice. The onion flavor mix consisted of sixteen (16) lbs. of onion powder, four (4) lbs. of MSG (monosodium glutamate), five (5) lbs. of salt, one (1) lb. of sugar, one-quarter (¼) lb. of both celery and garlic powders, and 0.006 lb. of both FDA food color yellow No. 5 and yellow No. 6, and twenty (20) lbs. of water. The mixture of water, rice and onion flavor was stirred and heated to its boiling temperature and then simmered for 35 minutes until the rice absorbed the water-onion flavor solution.

The cooked rice was then compressed and pumped or extruded through a die with ½" x ½" holes to form ribbons. The ribbons were passed through a cutter where they were cut into 3" long units. The units were then cooked in a hot (350° F. to 400° F.) vegetable oil for about one minute or until the proper crust was formed on their surfaces. Finally, the units were cooled and frozen. When reheated before consumption, the resultant rice product had an excellent flavor and mouth-feel.

It is believed that my invention has been described in sufficient detail so as to enable the skilled artisan to understand and practice the same. Variations in the consistency of the product and the process may be made without departing from the spirit and scope of the invention.

I claim:

1. A process for preparing a shaped and cooked rice product having an interior of softened rice grains or rice particles and a relatively hard exterior as compared with said interior which comprises: mixing rice grains or particles and water, heating the mixture for a sufficient period of time to soften said rice grains or particles and to absorb from 1 to 3.5 pounds of water per pound of said grains or particles, forming the produced product into a given shape, said product being composed of cooked and broken or unbroken rice grains containing individual rice cells, and heating said shaped product for a period of time sufficient to provide an exterior surface that is harder than the interior of said product, whereby said exterior surface allows the individual units to keep their predetermined shape while maintaining structural stability.

2. A process as in claim 1 wherein the ratio of rice grains or particles to water is from about 2 to 3 pounds of water per pound of rice.

3. A process as in claim 1 wherein said softened rice product is passed through an extruder to produce ribbons, wherein said ribbons are cut to form individual units, and wherein said units are heated to provide an exterior that is harder than the interior of said product.

4. A process as in claim 3 wherein said individual units are cooled and frozen for storage and shipping.

5. A process as in claim 1 wherein the rate of water absorption by the rice grains or particles is controlled so that a high percentage of rice cells is not broken during the cooking step.

6. A process as in claim 1 wherein said shaped product is rapidly frozen after the last heating step.

7. A process for preparing a shaped and cooked rice product having an interior of softened rice grains or rice particles and a relatively hard exterior as compared with said interior which comprises: coating rice grains or particles with an edible oil, mixing said coated grains or particles with water, heating the mixture for a sufficient period of time to soften said rice grains or particles, forming the produced product into a given shape, and heating said shaped product to provide an exterior surface that is harder than the interior of said product.

8. A process as in claim 7 wherein said softened rice grains or particles are passed through an extruder to produce ribbons, wherein said ribbons are cut to form individual units, and wherein said units are passed through heated oil to provide an exterior that is harder than the interior of said product.

9. A process as in claim 8 wherein said individual units are rapidly frozen after the last heating step.

10. The product produced by the process of claim 1.

References Cited

UNITED STATES PATENTS

| 400,835 | 4/1889 | Donelson | 99—80 R |
|---|---|---|---|
| 1,097,882 | 5/1914 | Saunders | 99—80 R |
| 1,945,947 | 2/1934 | McKay | 99—80 R |
| 3,332,781 | 7/1967 | Benson et al. | 99—80 R |
| 3,484,249 | 12/1969 | Tanaka et al. | 99—80 |
| 1,086,382 | 2/1914 | Mauterer | 99—83 |
| 1,110,267 | 9/1914 | Kellogg | 99—83 UX |
| 2,437,150 | 3/1948 | Berg | 99—83 |
| 3,190,755 | 6/1965 | Peden | 99—81 |

FOREIGN PATENTS

| 492,534 | 9/1938 | Great Britain. |
|---|---|---|
| Ad. 24,721 | 2/1903 | Great Britain. |

RAYMOND N. JONES, Primary Examiner

U.S. Cl. X.R.

99—83